(No Model.)
C. WHITTAKER.
BALL VALVE.
No. 326,613. Patented Sept. 22, 1885.
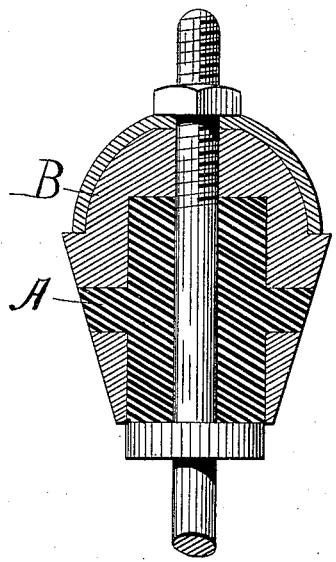
WITNESSES
A. Paré
Frank L. Douglas
Inventor
Charles Whittaker,
By Banning & Banning,
Attorneys

UNITED STATES PATENT OFFICE.

CHARLES WHITTAKER, OF CHICAGO, ILLINOIS.

BALL-VALVE.

SPECIFICATION forming part of Letters Patent No. 326,613, dated September 22, 1885.

Application filed October 20, 1884. (No model.)

*To all whom it may concern:*

Be it known that I, CHARLES WHITTAKER, a citizen of the United States, residing at Chicago, Illinois, have invented certain new and useful Improvements in Ball-Valves, of which the following is a specification.

The object of my improvement in valves is to make a ball-valve that will, while containing a sufficient elasticity for the purpose, be unaffected by its contact with hot water.

The drawing shows a longitudinal sectional view of the valve.

A represents an elastic material, and B represents a substantially inelastic material.

Heretofore ball-valves for faucets and other purposes have usually been made of rubber or similar material, which would afford the necessary elasticity to always insure a tight and perfect fit. The objection to the use of rubber has been found to be that it was affected by the action of hot water, so that it became softened and its utility and efficiency were greatly impaired and in time entirely destroyed, so that the faucet would leak, occasioning the necessity of renewing the valve from time to time. To overcome this difficulty, I make a valve in which the inner portion is made of rubber or other similar elastic material and the outer portion made of a composition like "vulcanized fiber," so called, that is unaffected by contact with hot water. This material is practically inelastic, but still capable of yielding slightly as the rubber or other elastic material within it is subjected to pressure, so that a perfectly tight and secure valve may be obtained.

While I have used vulcanized fiber for forming the exterior portion of the valve, yet other materials capable of yielding somewhat under pressure and unaffected by hot water may be employed.

The elastic material extends outward from the main body of the same, as shown, so that it serves to exert a pressure when the valve is drawn to its place in the valve-seat both endwise and sidewise, and by this pressure in all directions holds the valve tightly to its place.

The essential feature of my invention consists in making a valve of two substances, the inner one of which shall be elastic, and so located and arranged as to permit both sidewise and endwise yielding or elasticity, and the outer portion of which shall be practically incapable of being affected by heat, so that while one compresses the valve properly into place the other is not injured and destroyed by contact with hot water or steam.

In using the words "vulcanized fiber" I have had reference to a new substance produced by treating vegetable fiber (cellulose) in a disintegrated or finely-divided state with certain active and powerful chemical agents. The fiber is very tough and strong, and in its texture and general properties somewhat resembles horn, except that it is homogeneous throughout and has no stratification or cleavage. It is very solid and close grained, and can be readily sawed, planed, or turned, taking from a sharp tool a very beautiful finish. It may be made of less degree of hardness and still be very tough and strong; but instead of being stiff and rigid is pliable, like rubber or sole-leather. In its flexibility and appearance when thus made it closely resembles sole-leather, and may be readily mistaken for it. Unlike leather or rubber, however, it is unaffected by oils, fat, heat, &c., and does not become soft and limp, and in many cases useless, as they do when exposed to the action of hot water or other ordinary sources of heat. It is manufactured and sold in the market as vulcanized fiber, or, as it is sometimes called, "gelatinized fiber."

I claim as my invention—

A valve consisting of two parts, the inner part being composed of rubber or other elastic material provided with a lateral flange or rim, and the outer part being composed of vulcanized fiber, whereby both sidewise and endwise yielding or elasticity is secured, substantially as described, and for the purpose set forth.

CHARLES WHITTAKER.

Witnesses:
E. F. HUBBARD,
THOS. A. BANNING.